United States Patent [19]
Takagi et al.

[11] Patent Number: 5,928,728
[45] Date of Patent: Jul. 27, 1999

[54] METHOD FOR GLAZING CERAMICS

[75] Inventors: Hiroshi Takagi, Inazawa; Yoshimi Mori, Ichinomiya; Kouichi Ueda; Norihito Sakamoto, both of Nagoya, all of Japan

[73] Assignee: Noritake Co., Limited, Japan

[21] Appl. No.: 08/796,044

[22] Filed: Feb. 6, 1997

[30] Foreign Application Priority Data

Feb. 6, 1996 [JP] Japan ................................. 8-044229

[51] Int. Cl.$^6$ ..................................................... B05D 3/02
[52] U.S. Cl. .................................. 427/376.2; 427/397.7; 427/419.3
[58] Field of Search .................. 427/376.2, 397.7, 427/419.3

[56] References Cited

U.S. PATENT DOCUMENTS

| | | |
|---|---|---|
| 1,813,551 | 7/1931 | Smith . |
| 2,346,579 | 4/1944 | Henderson ................. 117/40 |
| 3,617,315 | 11/1971 | Vickery ................... 106/38.3 |
| 3,939,238 | 2/1976 | Salts ......................... 264/71 |
| 4,393,108 | 7/1983 | Barker et al. ............... 428/44 |
| 4,468,419 | 8/1984 | McBride ..................... 427/266 |
| 4,528,227 | 7/1985 | Frechtmann ................ 428/49 |
| 4,539,224 | 9/1985 | Matsuhisa ................. 427/190 |
| 4,806,334 | 2/1989 | Fujinaka et al. .......... 428/631 |
| 4,939,010 | 7/1990 | Goossens .................... 428/49 |
| 4,957,440 | 9/1990 | Hankins et al. ......... 433/201.1 |
| 4,971,858 | 11/1990 | Yamano et al. ............ 428/323 |
| 5,545,255 | 8/1996 | Ogawa ....................... 106/272 |

FOREIGN PATENT DOCUMENTS

| | | | |
|---|---|---|---|
| B 51-37658 | 10/1976 | Japan | C04B 41/06 |
| B57-27061 | 6/1982 | Japan | C04B 41/06 |
| A 5-262582 | 10/1993 | Japan | C04B 41/86 |
| A 5-310485 | 11/1993 | Japan | C04B 41/86 |

*Primary Examiner*—Benjamin Utech
*Attorney, Agent, or Firm*—Morrison & Foerster LLP

[57] ABSTRACT

A thin glaze layer 2 is formed on a relief surface 1R to a thickness which leaves recesses on the relief surface 1R. A glaze-repellent layer 4 capable of repelling the glaze slurry is then formed on the surface of the thin glaze layer 2 to form a coated substrate. The glaze slurry is affixed to the coated substrate for forming a glaze slurry layer 5 for completing the glazing.

With the conventional method for producing a ceramic article or for glazing, it has been extremely difficult to produce a ceramic article having a relief pattern of beautiful appearance, that is a ceramic article glazed to a sufficient thickness and presenting clearly defined crests and valleys of the relief pattern.

11 Claims, 6 Drawing Sheets

METHOD FOR GLAZING CERAMICS

TECHNICAL FIELD OF THE INVENTION

This invention relates to a method for glazing a ceramic article that can be used for various fields of application, such as a tableware or tiles, method for producing a ceramic comprising the glazing method, and glazed ceramic articles or wares.

The ceramic articles are generally produced by coating the entire surface of an unglazed bisque substrate with a glaze slurry, drying the glaze slurry and firing the resulting mass.

BACKGROUND

1. Related Art

Among the conventional methods for glazing ceramic articles, there are known such methods as are disclosed in JP Patent Kokoku JP-B-51-37658, JP Patent Kokoku JP-B-57-27061, JP-Patent Kokai JP-A-5-262582 and JP patent kokai JP-A-5-310485.

The JP Patent Kokoku JP-B-51-37658 is concerned with a technique for decorating a ceramic ware consisting in coating the surface of the ceramic article with a water-repellent agent containing an inorganic pigment and firing the resulting mass for fixing the pigment. By way of a preferred embodiment, there is described a technique of printing a water-repellent agent containing a pigment for underglazing for ceramic articles by a screen printing method for providing a water-repellent surface, further applying a dark-green transparent glaze thereon and firing the resulting mass to provide a colored surface having the water-repellent surface free from the risk of deposition of the glaze and also having the water-repellent surface colored with the pigment as a result of firing.

The JP Patent Kokoku JP-B-57-27061 is concerned with a decorating method consisting in (i) forming a contour pattern on a substrate surface with an oily pigment-containing silicone oil, (ii) painting a mixture of a glaze, a pigment and a water-soluble silicone water-repellent agent within the contour pattern, and (iii) brushing a common underglazing coloring agent on a dried surface, followed by application of a glaze and firing. The oily pigment exhibits sufficient water repellency so that the mixture is repelled and applied in a state of being swollen (or reliefed) in the contour pattern.

The JP Patent Kokai JP-A-5-262582 is concerned with a method for producing a pottery product consisting in partially coating the base surface with a water absorption speed adjusting agent designed for retarding the water absorption speed at the time of glazing prior to the glazing step, then applying the glaze on the substrate surface for forming a glaze layer and firing the resulting mass. It is stated in the Kokai-Publication that, while the moisture of the glaze applied tends to be easily absorbed by the substrate to facilitate deposition of the glaze in the substrate surface portion not coated with the water absorption speed adjustment agent, while the moisture of the glaze coated is not liable to be absorbed on the base surface portion coated with the adjustment agent so that the glaze is hardly deposited to reduce the thickness in this substrate surface portion thus forming a glaze layer having an irregular surface as a whole.

In the above Kokai-Publication, triethanolamine, polyvinyl alcohol, carboxymethyl cellulose, ethyl alcohol and ethylene glycol are stated as examples of the water absorption adjustment agent.

The JP Patent Kokai JP-A-5-310485 states that a fine irregular ceramic pattern is formed by taking advantage of the fact that a patterned printing pattern (decoration) by the water-repellent resin or a patterned printing (decoration) pattern prior to firing containing a fired pigment exhibit the repellent operation against the aqueous glaze, and by producing a glaze layer in which the portion in register with the patterned printing pattern is devoid of a pattern.

2. Discussion on the Related Art

However, according to the eager investigation toward the present invention there have been encountered following problems. With the conventional method for producing a ceramic article or with the conventional glazing method, it has been extremely difficult to produce a ceramic article having a relief pattern with attractive appearance, that is a ceramic article having a sufficient glaze thickness and exhibiting a clear irregular relief pattern.

In the production process for ceramic articles, the glaze is applied to a pre-set thickness sufficient to achieve the objectives of preventing the liquid or the gas from being permeated through the substrate, realizing the beautiful appearance inclusive of luster and color, and increasing the mechanical strength of the substrate. In general, the thickness of the fired glaze layer after firing is on the order of at least 0.3 to 0.4 mm.

However, if a relief pattern is formed on the substrate for affording more beautiful appearance to the ceramic articles, and if the glaze is applied in the same way as when there is no relief pattern on the substrate, an abundant quantity of glaze slurry is accumulated in recessed (engraved) portions of the relief surface than in other portions thus refilling the recesses to flatten out the relief surface.

The result is that the relief pattern of the relief surface becomes blurred such that it becomes extremely difficult to produce a ceramic article having a well-defined/clear-cut relief pattern of sufficient depth on the as-fired surface.

In particular, if the relief surface is machined more intricately or finely for realizing a more attractive surface, defects tend to be produced in a boundary area between the relief surface and the planar non-relief surface. In particular, defects in appearance, such as non-glazed portions like pinholes or sagging of the glaze slurry tend to be produced.

Meanwhile, if the glaze slurry is applied on the entire substrate surface, to a thickness not completely filling out the recesses on the relief surface, the glaze slurry applied to the base portion not taking part in forming the relief pattern becomes thin in thickness, such that the above objectives may not be achieved.

SUMMARY OF THE DISCLOSURE

Therefore, it is an objectives of the present invention to provide a novel method for glazing a ceramic article, a novel method for producing a ceramic article, and a novel ceramic article, which are devoid of the problem(s) discussed hereinabove. Further objections will become apparent in the entire disclosure.

If a thin glaze layer is formed on a relief surface of a substrate to a thickness which leaves recesses (engraved or gravured recesses) on the relief surface, and a glaze-repellent layer capable of repelling the glaze slurry is previously formed on the thin glaze layer, well-defined crests and valleys of the relief pattern are obtained even if the substrate is glazed in the same way as the substrate free of the relief surface.

That is, the above object is realized by a glazing method for the ceramic article, a method for producing a ceramic articles and a ceramic article as will be set forth hereinbelow.

The method for glazing a substrate comprises a step of applying a glaze slurry thereon, is characterized by employing, as the substrate, a substrate having a relief surface, a thin glaze layer coating the relief surface to a thickness which will leave recesses on the relief surface, a thin glaze layer coating the relief layer and an oil-repellent layer coating the thin glaze layer and repelling the thin glaze layer (Aspect 1).

Preferably, a glaze slurry is applied to a moistened relief surface for forming the thin glaze layer (Aspect 2).

Preferably, a thin glaze layer is formed using a glaze slurry containing a coloring agent (Aspect 3).

Preferably, the thin glaze layer is formed using a diluted glaze slurry (Aspect 4).

Preferably, the thin glaze layer is formed using a glaze slurry having a glaze concentration thinner than that of the glaze slurry desired to be applied on an exposed surface of the substrate not coated with the thin glaze layer or an exposed surface of the thin glaze layer (Aspect 5).

Preferably, the thin glaze layer is formed using a glaze slurry containing an thickener (Apect 6).

Preferably, a repellent glaze layer is formed by solid paraffin (Aspect 7).

Preferably, the thin glaze layer is formed on a non-glaze-repellent-layer forming surface (i.e., a surface having no glaze-repellent layer) of the substrate (Aspect 8).

The method for producing ceramics is characterized by having a glazing step of applying the glaze by the glazing method (Aspect 9).

The ceramic article has a fired substrate having a relief surface, a fired relief surface glaze layer coating the relief surface to a thickness which leaves recesses of the relief surface and a fired glaze layer having a thickness thicker than the fired relief surface glaze layer, the fired relief surface coating the surface of the fired substrate other than the relief surface (Aspect 10).

Since the glaze repellent layer (area) repels the glaze slurry, the glaze slurry can be selectively deposited on the substrate even if the glaze slurry has been applied on the entire substrate having the glaze repellent layer (area). That is, the glaze slurry is repelled by the glaze repellent layer (area) to prevent the glaze slurry from being deposited on the surface (area)of the glaze repellent layer. In addition, the glaze slurry can be deposited to a desired thickness on a base portion (area) not having the glaze repellent layer (an exposed base surface (area) not coated with the thin glaze layer, or an exposed surface (area) of the thin glaze layer).

Usually, the deposited thin glaze slurry layer is dried spontaneously by being allowed to stand as is. If the glaze slurry is dried, such a substrate can be obtained the relief surface of which is coated with the glaze (thin glaze layer) to a thickness which leaves recesses of the relief surface (area) and the surface excluding the relief surface (area) of which is coated with the glaze to a desired thickness.

By sintering the resulting mass of the substrate, there can be obtained a ceramic article having a fired relief surface glaze layer coating the relief surface (area) to a thickness which leaves recesses on the relief surface (area) and a fired glaze layer coating the fired base surface other than the relief surface (area) and having a thickness thicker than that of the fired relief surface glaze layer.

The present inventor has tried the following methods. However, with these methods, the inconveniences as will be later explained were encountered.

(1) Before depositing the glaze slurry on the substrate, water absorption suppressing agents, such as various oils, sealing agents (such as, for example MUTSUMI SEAL manufactured by MUTSUMI KAGAKU SHA), or pottery paint paste, capable of suppressing water absorption of the substrate, were previously dipped into the relief surface of the substrate with an intention of decreasing the amount of deposition of the glaze slurry onto the relief surface (area).

With this method, it is extremely difficult to control the deposition thickness of the glaze slurry accurately. Therefore, even if it is tried to coat the relief surface (area) uniformly with the glaze slurry layer, it is extremely difficult to deposit the glaze slurry on the relief surface (area) to a uniform thickness, so that it is difficult to form a beautiful relief surface.

(2) A mixture of a glaze slurry and a water-repellent agent was previously coated on the relief surface (area) and dried to form a glaze slurry deposition preventative layer, and the glaze slurry was subsequently re-deposited. This method, however, has the following disadvantages.

(i) The peak of the water-repellent effect is sustained for as short as two hours, so that constraint is imposed on the working time. (ii) The glaze slurry deposition preventative layer with a sharp edge cannot be formed, so that the boundary between the glaze slurry deposition preventative layer and the base surface portion not having this preventative layer cannot be selectively painted, and hence defects in appearance such as irregular glazing tends to be produced. (iii) Even at a peak time of the glaze repellent effect of the glaze slurry deposition preventative layer, a significant amount of the glaze slurry is deposited on the glaze slurry deposition preventative layer (area). (iv) Since the glaze slurry containing the water-repellent agent is hardly dried at ambient temperature, the glaze slurry deposition preventative layer needs to be dried by a heating/drying unit, so that it becomes difficult to carry out a continuous operation easily. (v) A step of removing the water-repellent layer is required.

(3) Before applying the glaze slurry on the substrate, paraffins or the commercially available oil-repellent agent (such as, for example, CP-S manufactured by SHIN-SHOWA COAT K.K.) were previously applied on the relief surface for completely preventing the glaze slurry from being affixed on the relief surface (area).

This method, however, has a drawback that, since the glaze slurry cannot be affixed to the relief portion, the as-fired substrate surface feels rough, while it tends to be contaminated, thus detracting from practical utility as a commercial product.

With the present invention, the above-enumerated problems can be overcome.

DESCRIPTION OF THE PREFERRED EMBODIMENTS

Glazing Method

Figure 1:
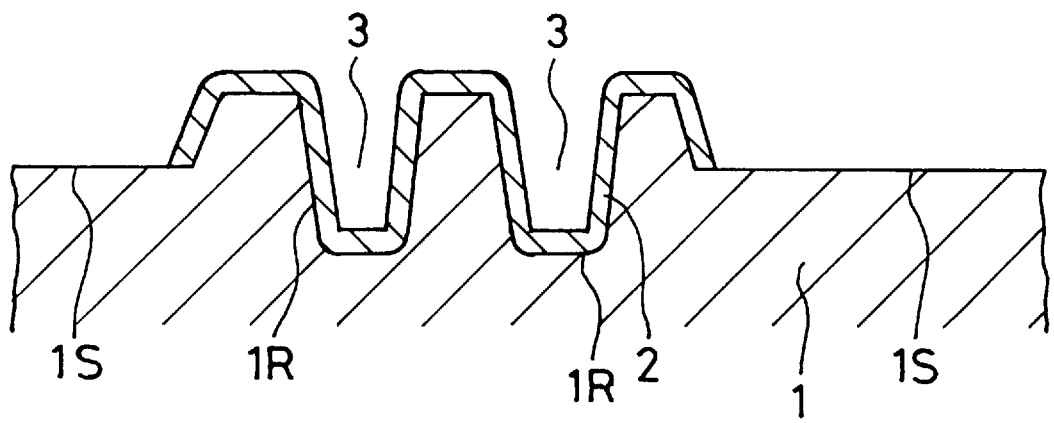
FIG. 1 is a cross-sectional view of a substrate having a relief surface and a thin glaze layer covering the relief surface to a thickness which leaves the recesses on the relief surface, with the cross-section taken along the thickness of the thin glaze layer.

As a substrate (base material) on which is affixed the glaze slurry, such a substrate having a relief surface (area), the above-mentioned specified thin glaze layer and the above-mentioned specified glaze repellent layer, sequentially formed as coating layers on the relief surface (area), is used. The manufacture of the coated substrate, having these coating surfaces, formation of the relief surface (area) and the formation of the coating layers, will be explained in this order.

Manufacture of Substrate

It suffices if the substrate (base material) has sufficient water absorption and strength necessary to withstand the operation for glazing. For example, unglazed green (raw) as molded products fresh form molding and not processed by heat treatment such as bisque (biscuit) firing may be used. Preferably, the substrate is a bisque-fired substrate or a substrate having water absorption and strength comparable to those of the bisque-fired substrate. Typically, a bisque-fired substrate suffices.

On the other hand, not only the substrate having a uniform composition but also a composite substrate made up of plural different base materials may be used. A composite substrate made up of two or more base materials of the same composition or different compositions in a multi-layered structure may also be used. Alternatively, such a substrate obtained on combining two or more component parts into one, such as a main portion (body) of a coffee cup and a handle portion integrated thereto, may be used as a substrate.

The molding means for the substrate may be appropriately selected depending on the sorts of the base materials. For example, if the base material is clay, the molding (forming or shaping) means may be a jigger. The slurry may be molded by a slip-casting method, while dry powders may be molded by a press molding method.

Formation of Relief Surface

The relief surface (area) on the substrate is a surface (area) in which a pattern is embossed or reliefed (engraved or gravured) by crests and valleys on the base surface.

The relief surface of the substrate may be formed by a variety of methods, such as hand engraving, casting, press working, or using a roller head machine. The relief surface may also be formed by pressing a sand etc. which is a relief surface-forming material against the substrate.

The relief surface may be formed after molding the substrate, but also simultaneously with molding the substrate. For example, by engraving a pattern in a plaster mold surface used in the slip-casting method or a metal mold surface used in the press molding method, a relief surface may be formed on the substrate to be molded.

The molded substrate, having the relief surface molded thereon, is, preferably, fired in an oxidizing atmosphere at an optional temperature of 800 to 900° C. after drying for affording water absorption and mechanical strength required at the time of glazing.

Formation of Coating Layers

The substrate on which to deposit the glaze slurry has a thin glaze layer and a glaze repellent layer, as coating layers.

The thin glaze layer is used for coating the relief surface and is formed on the relief surface. The thin glaze layer is formed to a thickness which will keep the depth of the residual recesses on the relief surface. The thickness of the thin glaze layer is set appropriately, depending on the size of the recess on the relief surface, so that the recess will not be filled out. If the size (depth and width) of the recess of the relief surface is 0.2 to 1.0 mm, the above thickness is preferably set to an appropriate value between 0.03 mm and 0.20 mm, approximately.

The thin glaze layer is usually provided so as to be substantially coextensive as the relief surface (area) for covering the relief surface in its entirety. However, if need be, the thin glaze layer may also be provided so as to cover only a portion of the relief surface or so as to cover part or all of the relief surface (area) and part or all of the non-relief surface. If necessary, the thin glaze layer may be provided for covering the entire base surface.

Meanwhile, the thin glaze layer may be provided discretely (or intermittently), if need be, such as when the relief surface areas on the substrate are present discretely. Although the thin glaze layer may be formed discontinuously responsive to the discontinuous relief surface areas, the thin glaze layer may also be formed continuously, even in such cases.

The glaze repellent layer is a layer which repels the glaze slurry, and covers the thin glaze layer. The glaze repellent layer may be provided in part or all of the thin glaze layer in an area thereof covering the relief surface (area) to a thickness which will leave the recesses.

If need be, the glaze repellent layer may be provided beyond the area where there exists the thin glaze layer. That is, part of the glaze repellent layer may be directly contacted with the relief surface (area) or with the non-relief surface (area) of the substrate. The glaze repellent layer is preferably formed of a material which volatalizes off on firing the substrate.

(1) the thin glaze layer is preferably formed by depositing the glaze slurry on the substrate. Usually, the glaze slurry affixed on the substrate becomes dried at ambient temperature to form the (dried) thin glaze layer, if the affixed glaze slurry layer is allowed to stand as is.

The thin glaze layer is formed using a thin glaze slurry, which forms a coating layer lower in glaze concentration than usual glaze slurry (glaze slurry deposited on an exposed surface (area) of the substrate not coated with the thin glaze layer or on an exposed surface (area) of the thin glaze layer). Alternatively, the thin glaze layer is formed using a glaze slurry obtained on diluting the usual glaze slurry, such as the glaze slurry which forms a glaze slurry layer having a smaller amount of deposition than with the usual glaze slurry.

The glaze used for the glaze slurry for forming the thin glaze layer is preferably the same glaze as used for the glaze slurry desired to be affixed to the base surface other than the relief surface (area).

Preferably, the glaze slurry is deposited to form the thin glaze layer so that the glaze slurry has a thickness directly after firing equal to an optional value from 0.2 mm to 0.1 mm, preferably 0.15 mm to 0.1 mm and, if need be, an optional value not more than 0.1 mm.

The relief surface (area), on to which the glaze slurry is affixed, is preferably moistened so that even a small amount of the glaze slurry can be deposited and affixed to the substrate.

Any moistening agent used for moistening the relief surface suffices if such gent exhibits affinity with respect to the glaze slurry. For example, water, water-soluble solvents or mixtures thereof, may be employed. The moistening agent may be affixed on the relief surface of the substrate using a spray, a brush or a writhing brush, alone or in combination. Preferably, the moistening agent is applied uniformly.

The moistening agent is preferably applied twice on the substrate. The flat-shaped substrate, such as a saucer, may be moistened using a jigger. If the jigger is used, the moistening agent can be easily applied twice. The moistening agent is preferably applied twice on a bag-shaped substrate, such as a pot.

As means for forming the thin glaze layer, a brush may be used for applying the glaze slurry with reduced glaze concentration into recesses of the relief surface. If the coating means such as brush is used, the coating may be done on substrates of a various shapes without shape dependency. For example, coating may be done on an article other than an article of rotation, such as an elliptically-shaped saucer. If the glaze slurry is accumulated in the recesses, the glaze slurry needs to be removed from the recesses.

If a mask is provided in an area in which it is not desired to deposit the glaze slurry, the glaze slurry can be selectively deposited only on the relief surface (area) by a spray coating method or by coating the glaze slurry with a brush on the coating substrate being rotated on the jigger. This method enables an unskilled person to selectively deposit the glaze slurry on the relief surface. If the glaze slurry is accumulated in the recesses on the relief surface, it is removed from the recesses. If the relief surface is formed continuously in the circumferential direction of the coating substrate in the form of a body of rotation, such as pot or urn, it is not necessary to provide a mask on a non-relief surface neighboring to the relief surface (area).

If the thin glaze layer is formed by coating the glaze slurry, and the glaze slurry thus coated is dried spontaneously by being allowed to stand at room temperature (10 to 30° C.), it is unnecessary to perform forced drying by heating. However, if necessary, drying can be performed by setting suitable drying conditions, such as temperature, humidity and atmosphere.

The glaze slurry for forming the thin glaze layer may, for example, be of specific gravity of 1.28 to 1.30 and viscosity (measured at 60 rpm) of 50 to 70 cps. For example, this glaze slurry can be prepared by agitating 500 parts by weight of dry powders of glaze, 100 parts by weight of carboxymethyl cellulose (5% aqueous solution) as a thickener, 0.5 part by weight of Rhodamine, as a coloring agent and 299.5 parts by weight of water, by a mixer, such as a pot mill, for an optional time period of 30 to 60 minutes.

If the thickener is used, the glaze slurry, having a concentration lower than the usual concentration can be coated easily with a brush or the like. Such thickener, that can be burned off in the course of the oxidation firing, is appropriately selected from, for example, water-soluble high molecular organic compounds (organic polymers). Although the thickener usually need not be contained in the glaze slurry affixed to the non-glaze-repellent-layer-forming surface (area) of the substrate coated with the thin glaze layer, it may be contained therein if so desired.

If the coloring agent is contained in the glaze slurry as described above, the range of formation of the thin glaze layer can be clarified, thus enabling the boundary between the thin glaze layer forming area and the area other than this thin glaze layer forming area to be visualized reliably. Although the concentration of the glaze slurry tends to be varied on prolonged use, such change in the glaze slurry concentration can be perceived by containing the coloring agent in the glaze slurry. In addition, patterns of different colors can be applied to the surface of the substrate or ceramic articles by containing coloring agents of different colors from the color of the glaze used in the glaze slurry deposition step.

If the glaze slurry is applied on the substrate using a jigger and a brush, a sufficient amount of the glaze slurry is contained in the brush and, as the jigger is rotated, the glaze slurry is applied by lowering the brush onto a mid portion of the relief surface, so that no glaze slurry is accumulated in the recesses of the relief surface. Preferably, coating is done twice. If the coating is done over a prolonged time, the glaze slurry is preferably agitated at all times with a brush. If the glaze slurry is raised in viscosity due to prolonged use, it should be exchanged with a new one.

If there is a pinhole on the relief surface, it is filled out with the glaze slurry.

(2) Formation of Glaze Repellent Layer

The material for forming the glaze repellent layer may be oily or aqueous if it has the properties of covering the thin glaze layer and repelling the glaze slurry. Preferably, the material is capable of being intimately affixed to the thin glaze layer at the time of coating the thin glaze layer (at least is not fluidic or free-flowing), in addition to having the above properties. More preferably, the material should assume a solid state at the time of coating the thin glaze layer, in addition to having the above properties.

Such material may be enumerated by, for example, a water-repellent agent, containing an organic compound exhibiting water-repellent property, such as silicone, preferably solid paraffin or resins. An emulsion obtained on dispersing the silicone oil in an aqueous solvent, such as water, may also be used. Such material that is liquid at room temperature is preferably coated on the thin glaze layer and dried, while such material that is dried in short time at room temperature need not be dried by a special drying step.

For forming the glaze repellent layer, preferably a layer of a liquid glaze repellent material is applied. If the material of the glaze repellent material is solid at room temperature, as in the case of solid paraffin, it is dissolved on heating and thereby converted into a liquid, which is applied. Solid paraffin is dissolved on heating for ease in application. Solid paraffin which is liquid on heating to an optional temperature of from 150 to 160° C. may be used. Preferably, solid paraffin melting at 130° C. or higher and preferably at 135° C. or higher may be used. Since solid paraffin melting at higher temperatures ceases promptly to be fluid and converted into the solid state promptly on being applied to the thin glaze layer, thus enabling a sharp edge to be formed with less bleeding to the thin glaze layer.

If the glaze-repellent-layer-forming material, such as liquidized solid paraffin, is applied on the relief surface for forming the glaze-repellent layer on the relief surface, the liquidized glaze-repellent-layer-forming material is first applied to a boundary area between the inner side and the outer side of the relief layer (and, if necessary, further cooled and dried) to form an annular glaze-repellent layer. Finally, the liquidized glaze-repellent-layer-forming material is applied to the inside of the annular glaze-repellent layer (and, if necessary, further cooled and dried) to form an ultimate annular glaze-repellent layer.

If the liquidized glaze-repellent-layer-forming material is applied to the inner side of the annular glaze-repellent layer, care should be taken so that the liquidized glaze-repellent-layer-forming material preferably is not exuded out of the annular glaze-repellent layer.

If solid paraffin liquidized by heating is used as the liquidized glaze-repellent-layer-forming material, the glaze-repellent effect sometimes is slightly lowered at lower heating temperatures. Thus it is preferred to heat the solid paraffin to an optionally set temperature higher by 10 to 15° C., desirably by not lower than 20° C., which is higher than the melting temperature of the solid paraffin, but which is lower than the ignition temperature or a temperature providing temperature deterioration. For example, although solid paraffin melting at 135° C. can be liquidized at 135° C. and used in this state, it is preferably heated to an optional temperature of 150 to 160° C. to a liquid, which is applied.

The thickness of the glaze-repellent layer is desirably such as to fill out defects such as pinholes. The thickness is preferably not less than 0.10 mm and more preferably 0.12 to 0.15 mm.

Meanwhile, if the thin glaze layer of the substrate is touched with a hand to which the solid paraffin is affixed, the thin glaze layer thus touched tends to be peeled off. Therefore, touching the thin glaze layer should be avoided.

Glaze Slurry Application Step

The glaze slurry application step is the step of affixing the glaze slurry to a substrate having two coated layers, namely the specified thin glaze layer and the specified glaze-repellent layer (referred to hereinafter as coated substrate).

A glaze slurry can be applied in a layer of a desired thickness at a desired spot (area) on the non-glaze-repellent-layer-forming surface (that is an exposed base surface area not coated with the glaze-repellent layer and an exposed surface area of the thin glaze layer) to form a glaze slurry layer.

As means for applying the glaze slurry on the coated substrate, there is a method of dipping the coated substrate in the glaze slurry, or a method of spraying the glaze slurry onto the coated substrate. Since the glaze-repellent layer repels the glaze slurry, the glaze slurry can be affixed easily only on the entire surface of the non-glaze-repellent-layer-forming surface (area) to form the glaze slurry layer.

If the coated substrate is dipped in the glaze slurry, the water absorption ratio, as computed by (saturation weight−dry weight)/dry weight×100%, is preferably set to an optional value between 20 and 24%. However, if the spraying is used, the water absorption ratio may also be an optional value of 0 to 10% or less in addition to the above range. The saturation weight herein means the total weight of water absorbed by the coated substrate having the thin glaze layer and the glaze repellent layer when such substrate has absorbed water to a state of saturation. The dry weight means the dry weight of the coated substrate having the thin glaze layer and the glaze repellent layer.

The thickness of deposition of the glaze slurry on the non-glaze-repellent-layer-forming surface is set to such a value for which at least one of the objectives of preventing permeation of a liquid or a gas through the substrate for firing, beautiful appearance, such as luster or color or increased mechanical strength of the substrate, will be realized after firing. For example, the glaze slurry can be applied to a thickness which will give a thickness after firing of an optional value from 0.3 to 0.4 mm.

For general glaze, the water content of the glaze slurry is preferably an optional value of 40 to 45%.

The glaze slurry is affixed to the desired non-glaze-repellent-layer-forming surface to form a glaze slurry layer. The glaze-repellent layer is removed after forming a dry glaze layer on the coated substrate. The glaze-repellent layer is preferably formed of an organic material since then the glaze-repellent layer can be burned off during the firing process as later explained and hence there is no necessity of providing a glaze repellent layer removing step.

The glaze of the glaze slurry applied on the relief surface for forming the thin glazer layer may be of the same composition as the glaze slurry to be applied to the non-relief surface. The transparent glaze and the matted or colored glaze can be appropriately combined together for improving decorativeness.

For example, a transparent glaze composed of feldspar (40 wt %), siliceous stone (35 wt %), limestone (10 wt %) and baked kaolin (15 wt %) may be combined with a matted glaze composed of feldspar (33 wt %), siliceous stone (25 wt %), limestone (12 wt %), baked talc (12 wt %) and baked kaolin (15 wt %).

If a colored glaze is desired, metal oxides, as a coloring agent, are added to the glazes. For example, a pale blue color may be developed by adding 0.5 to 1.5 wt % of cobalt oxide for reducing firing, while a yellow to brownish color can be developed by adding 3 to 5 wt % of ferric oxide for oxidating firing.

Method for Producing Ceramic Article

The method for producing a ceramic article according to the present invention includes a step of applying the glaze in accordance with the above-described glazing method for the ceramic article. The drying step and the firing step may be provided in succession to the glazing step.

Drying Step

The glaze slurry affixed to the coated substrate is spontaneously dried by allowing it to stand at ambient temperature (an optional temperature of 10 to 30° C.). Therefore, the forced drying by heating is not absolutely necessary. However, the coated substrate or the glaze layer may be dried, if need be, by setting drying conditions, such as temperature, humidity or atmosphere.

The substrate having both the glaze layer and the glaze-repellent layer is fired ultimately at elevated temperatures by a firing step for forming a chinaware (or porcellain).

The firing temperature is an optional temperature preferably of 1250 to 1350° C. and more preferably 1280 to 1320° C.

The glaze for oxidating firing is retained in an oxidizing atmosphere at an optional temperature preferably within a maximum temperature range of 1220 to 1260° C. By this oxidating firing, any organic materials, possibly present in the glaze-repellent layer or in the glaze layer, can be burned off and removed.

The glaze for reducing firing is retained in a reducing atmosphere at an optional temperature preferably within a maximum temperature range of 1280 to 1320° C. Preferably, a pre-firing zone with an oxidating atmosphere at an optional temperature of 1000 to 1100° C. is provided as a pre-stage previously of holding the above-mentioned maximum temperature range for burning off and removing the organic substances possibly present in the glaze-repellent layer or in the glaze layer.

Ceramic Article

The substrate for firing has a relief surface. A fired glaze layer for the relief surface covers the relief surface to a thickness which will keep the thickness of the recesses on the relief surface. The fired glaze layer for the relief surface may be provided in the relief surface for covering part of the relief surface. The fired glaze layer for the relief surface may also be provided so that a portion thereof covers part or all of the relief surface while its other portion extends beyond the relief surface to cover the non-relief surface.

The fired glaze layer covers the surface of the fired substrate other than the fired relief surface and is formed so as to be thicker in thickness than the fired glaze layer for the relief surface. The fired glaze layer may be provided so that its portion covers the relief surface while its remaining portion covers the non-relief surface. The fired glaze layer may be formed continuously or discontinuously.

The thickness of the fired glaze layer for the relief surface is the thickness which will leave the recesses on the relief surface on the fired substrate and depends on the size of these recesses. Thus the fired glaze layer for the relief surface may be an appropriate value of, for example, not more than 0.2 mm or in a range from 0.05 to 0.15 mm, approximately. If the thin glaze layer obtained from the glaze for reducing firing as a starting material is fired by reducing firing, the fired glaze layer for the relief surface may be of an appropriate thickness of the order of 0.15 mm or less.

The thickness of the fired glaze layer covering the fired substrate other than the fired relief surface can be made thicker than that of the fired glaze layer for the relief surface and can be set to, for example, 0.3 mm or larger.

By way of an example of the combination of the thickness of the fired glaze layer for the relief surface and that of the fired glaze layer, the thickness of the fired glaze layer for the relief surface may be of an optional value of 0.05 to 0.2 mm, such as 0.10 mm, while the thickness of the fired glaze layer may be of an optional value of 0.3 to 0.4 mm, such as 0.3 mm.

EXAMPLES

Example 1

An Example of the glazing method according to the present invention will be now explained by referring to the drawings.

FIG. 1 shows, in cross-section, a substrate having a relief surface and a thin glaze layer covering the relief surface to a thickness which will leave recesses on the relief surface, with the cross-section being taken along the thickness of the thin glaze layer. A substrate 1 has a relief surface 1R and a planar surface (non-relief surface) 1S. The thin glaze layer is formed to cover the relief surface 1R to a thickness which leaves recesses 3 on the relief surface 1R.

Figure 2:
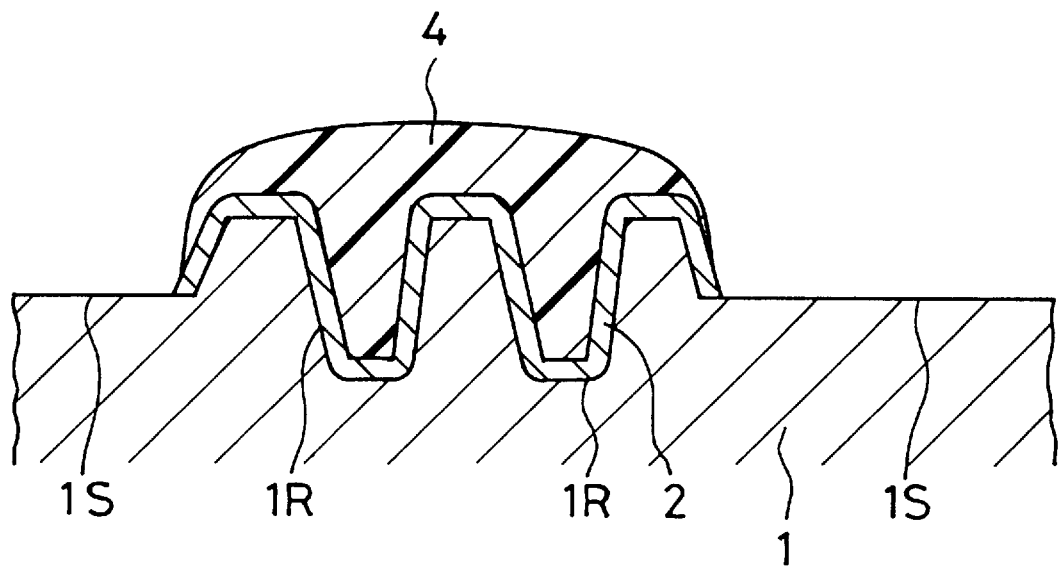
FIG. 2 is a cross-sectional view showing a coated substrate having a glaze repellent layer for coating the thin glaze layer of the substrate of FIG. 1, with the cross-section being taken along the thickness of the thin glaze layer.

FIG. 2 shows a coated substrate after forming a glaze-repellent layer on the substrate of FIG. 1 covered by the thin glaze layer. FIG. 2 shows, in cross-section, the coated substrate having a glaze-repellent layer for covering the thin gaze layer for the substrate of FIG. 1, with the cross-section being taken along the thickness of the thin glaze layer. A glaze-repellent layer 4 formed of solid paraffin is formed to cover the major portion of the thin glaze layer 2. Although the glaze-repellent layer 4 is less charged, the less the recesses 3 on the relief surface are in FIG. 2, the glaze-repellent layer 4 may also be provided for covering the relief surface 1R to a thickness which will leave the recesses 3 on the relief surface 1R.

Figure 3:
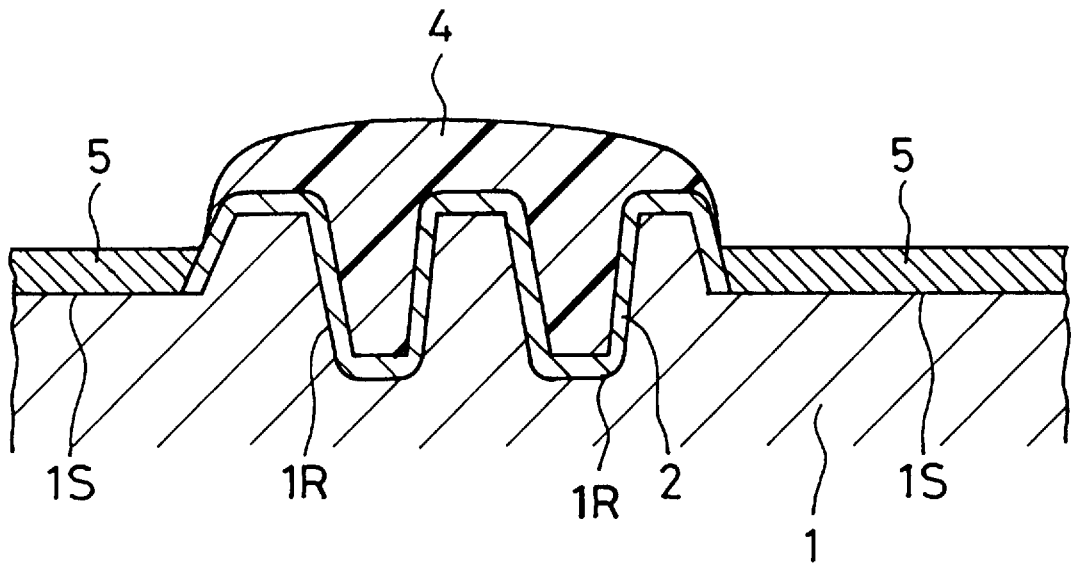
FIG. 3 is a cross-sectional view of the thin glaze layer after formation of the glaze slurry layer on the coated substrate of FIG. 2, with the cross-section being taken along the thickness of the thin glaze layer.

FIG. 3 shows the coated substrate after forming the glaze slurry layer by dipping the substrate of FIG. 2 covered by the thin glaze layer and the glaze repellent layer in a glaze slurry for depositing the glaze slurry thereon. Since the glaze-repellent layer 4 repels the glaze slurry, the glaze slurry layer 5 is selectively formed only on the surface of the planar surface (non-relief surface) 1S of the substrate 1, without being formed on the surface of the glaze-repellent layer 4. Such glaze slurry layer is dried even if left at ambient temperature to form a dried glaze layer.

Figure 4:
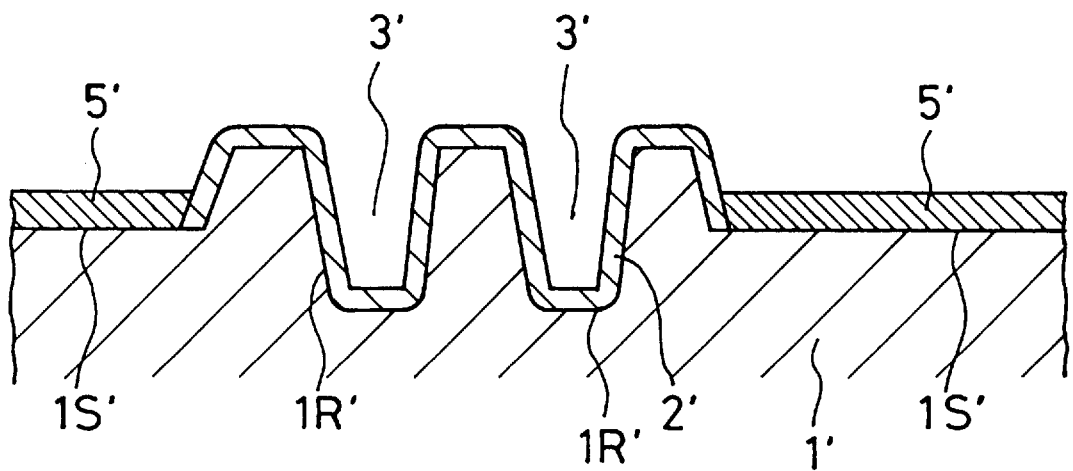
FIG. 4 is a cross-sectional view of a ceramic article having the fired glaze layer for the relief surface, with the cross-section being taken along the thickness of the fired glaze layer for the relief surface.

If the coated substrate having the dried glaze layer formed thereon is fired, the glaze-repellent layer 4, formed of solid paraffin, is burned off during firing, to give a ceramic article shown in FIG. 4 showing, in cross-section, a ceramic article having a fired glaze layer for a relief surface, with the cross-section being taken along the thickness of the fired glaze layer for the relief surface. The ceramic article of FIG. 4 has a fired substrate 1' having a relief surface 1R', a fired glaze layer 2' for the relief surface covering the relief surface 1R' to a thickness which will leave recesses 3' in the relief surface 1R' and a fired glaze layer 5' of a thickness thicker than the fired glaze layer 2' for the relief surface covering the planar surface (non-relief surface) 1S' of the fired substrate 1'.

Figure 5:
FIG. 5 is a photo showing a fine pattern (relief pattern) formed on a ceramic substrate (biscuit fired substrate).
Figure 6:
FIG. 6 is a photo showing a fine pattern (relief pattern) formed on a ceramic substrate obtained on glazing and firing in accordance with a conventional technique.
Figure 7:
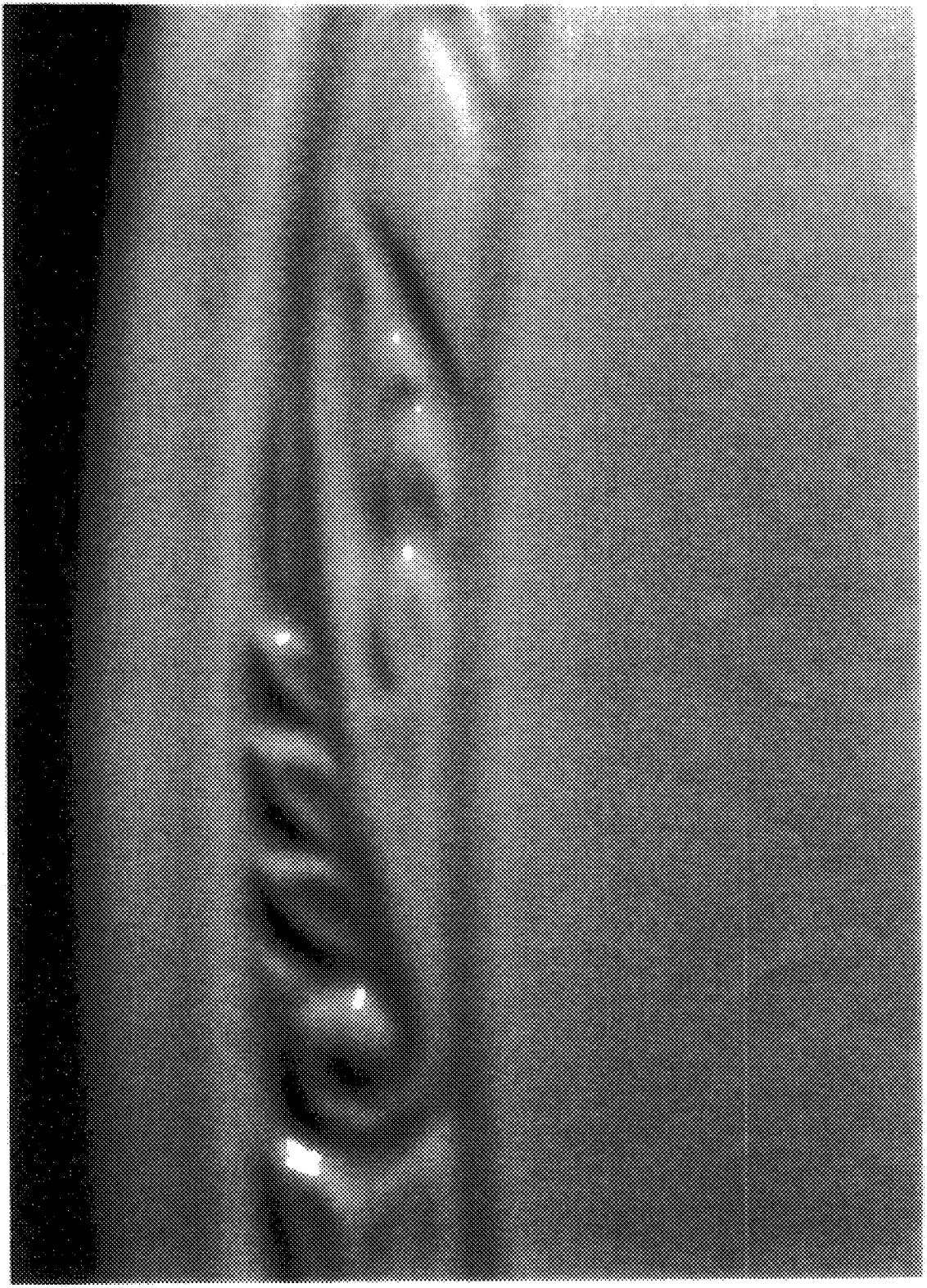
FIG. 7 is a photo showing a fine pattern (relief pattern) formed on a ceramic substrate obtained on glazing and firing in accordance with an embodiment of the present invention.

FIG. 5 shows an example of a biscuit-fired substrate having a relief surface, while FIG. 6 shows an example of a surface of a ceramic article produced by glazing a biscuit-fired substrate having a relief surface and by firing the resulting glazed article in accordance with a conventional technique. FIG. 7 shows an example of a surface of a ceramic article produced by glazing in accordance with the glazing method of the present invention and by firing the resulting glazed product.

An example of a glaze for reducing firing the glaze slurry used for forming the thin glaze layer is a composition containing 30 wt % of feldspar, 40 wt % of siliceous stone, 8 wt % of dolomite, 4 wt % of limestone, 8 wt % of baked talc and 10 wt % of baked kaoline. The baked kaoline of the glaze may be partially replaced by alumina.

An example of the glaze for oxidating firing is a composition containing 40 wt % of feldspar, 20 wt % of siliceous stone, 5 wt % of dolomite, 20 wt % of limestone and 15 wt % of baked kaoline. The dolomite and the siliceous stone of the glaze can be partially replaced by zinc oxide.

Example 2

Figure 8:
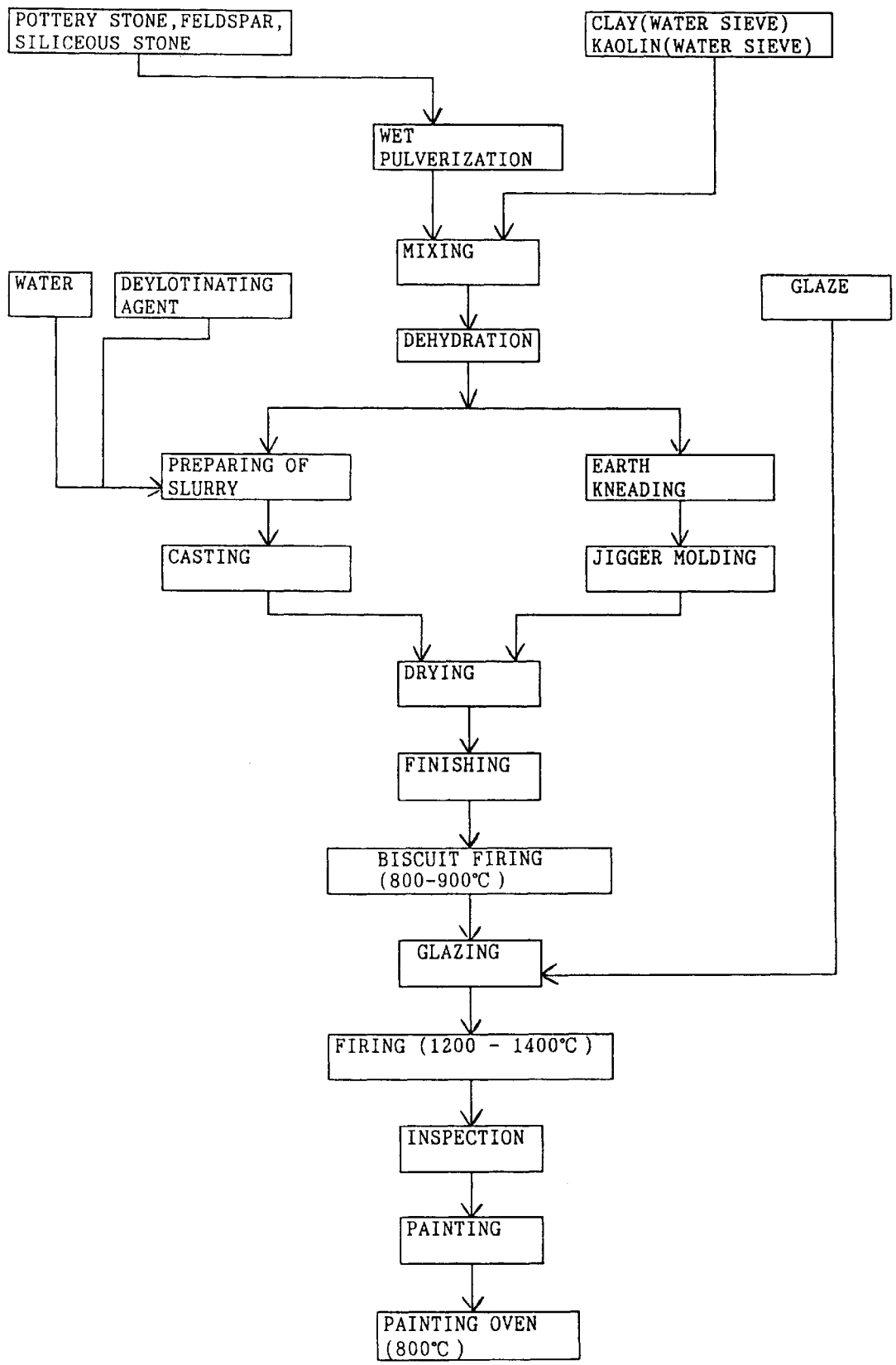
FIG. 8 is a typical flow sheet for producing a ceramic tableware.

FIG. 8 is a typical flow sheet for producing a chinaware as a tableware. An example of execution of the present invention is explained in detail with reference to this flow sheet.

For producing the substrate, 25 parts by weight of feldspar and 20 parts by weight of siliceous stone as starting materials were weighed out. The resulting mixture is admixed with suitable amounts of water and balls and the resulting mixture is pulverized in a wet state in a pot mill.

With progress in pulverization, clay substances, such as kaoline, is added in an amount of 55 wt % and pulverizing and mixing are further continued.

The pulverizing sequence may, of course, be changed from that described above if pulverization is done previously or if porcellain (or pottery) stone, for example, is used.

The chemical composition of the substrate of the above composition was $SiO_2$ (62.9 wt %), $Al_2O_3$ (23.8 wt %), $Fe_2O_3$ (0.6 wt %), CaO and MgO (0.7 wt % when added together), $K_2O$ (3.1 wt %), $Na_2O$ (1.7 wt %), and an ignition loss (7.1 wt %).

The resulting composition in the form of finely pulverized ingredients in a slurry is passed through a #150 to #200 mesh screen to remove coarse particles and subsequently passed through an iron remover for removing iron components. The degree of pulverization of the slurry is preferably such that particles with a mean particle size of 8 $\mu$m or less account for 50% or more.

This slurry is then dehydrated by a filter press and sent to the next step as a press cake or transiently stored as the slurry.

The substrate for molding, having a relief surface, may be produced by jigger molding or slip-casting. In the present Example, the substrate is produced by the jigger molding in the following manner.

The above press cake is charged into a vacuum earth kneader and extruded as a rod-shaped (cylindrically-shaped) plastic body which is then cut into discs by a cutter provided directly after an extrusion aperture.

The plastic body is molded to a desired shape by a jigger molding device. The jigger molding device has a plaster mold (lower mold) placed on a jigger shaft. The plastic body is charged into this plaster mold and a metallic jiggering (rotary) mold half (upper mold) is allowed to descend thereon for pressing and stretching (rolling) the plastic body in order for intimately contacting the plastic body with the mold. If the mold has a relief pattern of a pre-set shape, it is transcribed on the plastic body to produce a saucer or a cup having such relief pattern.

The green (undried) substrate, having a surface relief pattern, is then sufficiently dried and charged into a kiln where it is heated to 800 to 900° C. in an atmosphere for producing a biscuit-fired substrate exhibiting moderate hygroscopicity and strength.

The glazing operation will be now explained.

The biscuit-fired substrate, having the relief pattern, is lightly wiped (brushed) with a brush impregnated sufficiently with water for moderately moistening the wiped portion.

As an example of the glaze suited to this substrate, a colored glaze slurry, with a water content of approximately 44 wt % and a viscosity of 60 CPS, having a glaze density slightly lower than that of the usual glaze slurry, was prepared by admixing fine powders of the glaze having a composition represented by (0.3 $K_2O$+0.7 CaO) 0.8 $Al_2O_3$.8$SiO_2$ in Seger equation with water, a minor amount of an adhesive (carboxymethyl cellulose) and a red coloring agent (Rhodamine).

A brush or a writing brush is then impregnated with the slurry. The biscuit-fired substrate is placed on a jigger table (disc). As the jigger table is rotated, the brush or the writing brush is applied to the relief portion for applying the glaze base only to the relief portion. After the substrate is dried, paraffin fused by being heated to 150 to 160° C. is applied with a brush or a writing brush to the glazed relief portion for forming a glaze repellent layer.

The biscuit-fired substrate, having its relief portion coated with paraffin, is glazed over its entire surface with a glaze slurry having the same composition as but a viscosity and density slightly higher than that used previously.

There is no particular limitation to the glazing method. Such a technique may be used in which the biscuit-fired substrate is immersed in its entirety in a usual glaze slurry and taken out therefrom in several seconds.

Since the relief portion has been processed with glaze repelling treatment by paraffin, no glaze is affixed thereto. If there is any glaze accumulated thereon, it may be easily removed later on.

The biscuit-fired substrate thus glazed on its entire surface is charged into a refractory sagger one by one and reducingly fired in a tunnel kiln at a temperature SK13 at the maximum. The SK13 temperature is the temperature (1300° C.) at which an SK 13 cone is fused and collapsed by firing in accordance with the Seger cone as prescribed in JIS R 8101.

Table 1 shows the chemical compositions of various glazes used in the present invention. These glazes are used selectively taking matching to the substrates into account.

TABLE 1

|  | For Reductive Firing | For Oxidative Firing | Transparent Glaze | Matted Glaze |
| --- | --- | --- | --- | --- |
| $SiO_2$ | 68–72 | 53–57 | 68–72 | 64–68 |
| $Al_2O_3$ | 8–11 | 12–15 | 12–15 | 11–14 |
| CaO | 4–6 | 11–14 | 5–7 | 6–8 |
| MgO | 3–5 | 1–2 | 0–2 | 4–6 |
| ZnO | — | 0–3 | — | — |
| $K_2O$ | 3–4 | 4–5 | 4–5 | 4–5 |
| $Na_2O$ | 1–2 | 1–2 | 1–2 | 1–2 |

In the present Example, the glaze for the relief portion is the same as the glaze for the remaining portion, that is the non-relief portion. However, the two glazes may also differ from each other within the purport of the invention.

Example 3

For preparing the substrate, 25 parts by weight of feldspar and 20 parts by weight of quartz as starting materials are admixed with appropriate amounts of water and balls and the resulting mixture is wet-pulverized in a pot mill. The resulting pulverized product is admixed with 55 parts by weight of kaoline and pulverization and mixing are continued further.

The chemical composition of the above substrate was $SiO_2$ (62.9 wt %), $Al_2O_3$ (23.8 wt %), $Fe_2O_3$ (0.6 wt %), CaO and MgO (0.7 wt % when added together), $K_2O$ (3.1 wt %), $Na_2O$ (1.7 wt %), and an ignition loss (7.1 wt %).

The resulting composition in the form of finely pulverized ingredients in a slurry is passed through a #150 to #200 mesh screen to remove coarse particles and subsequently passed through an iron remover for removing iron components. The degree of pulverization of the slurry is set so that particles with a mean particle size of 8 $\mu$m or less accounted for 50% or more.

The slurry is then dehydrated by a filter press to form a press cake.

The substrate for molding, having the relief surface, is molded by a jigger in the following manner.

The press cake is charged into a vacuum earth kneader and extruded as a rod-shaped (cylindrically-shaped) plastic body which is then cut into discs by a cutter provided directly after an extrusion aperture.

The plastic body is then molded into a saucer by a jigger molding device. A plaster mold placed on a jigger shaft of a jigger molding device is formed with a pre-set irregular shape capable of producing a relief, so that a substrate for a saucer having a relief pattern is formed.

The green (undried), having a surface relief pattern, is then sufficiently dried and charged into a kiln where it is heated to 800 to 900° C. in atmosphere for producing a biscuit-fired substrate exhibiting moderate hygroscopicity and strength.

The above-described biscuit-fired substrate is then glazed by the following method.

The biscuit-fired substrate, having the relief pattern, is lightly wiped with a brush impregnated sufficiently with water for moderately moistening the wiped portion.

As an example of the glaze suited to this substrate, a colored glaze slurry, with a water content of approximately 44 wt % and a viscosity of 60 CPS, having a glaze density slightly lower than that of the usual glaze slurry, was prepared by admixing fine powders of the glaze having a composition represented by $(0.3\ K_2O+0.7\ CaO)\ 0.8\ Al_2O_3.8SiO_2$ in Seger equation with water, a minor amount of an adhesive (carboxymethyl cellulose) and a red coloring agent (Rhodamine).

The moistened biscuit-fired substrate is placed on a jigger table. As the jigger table is rotated, the brush or the writing brush is applied to the relief portion for applying the glaze base only to the relief portion. After the substrate was dried, paraffin fused by being heated to 150 to 160° C. is applied with a brush or a writing brush to the glazed relief portion for forming a glaze repellent layer.

The biscuit-fired substrate, having its relief portion processed with paraffin as described above, is glazed on its entire surface with a colored glaze slurry of having the same composition as but a viscosity and density slightly higher than that used previously (moisture content of 43 wt % and viscosity of 100 CPS).

The biscuit-fired substrate thus glazed on its entire surface is charged into a refractory sagger one by one and reducingly fired in a tunnel kiln at a temperature SK13 (1300° C.) to form a saucer-shaped ceramic article.

Effect of the invention will be summarized hereinbelow, but, without limiting thereto.

With the glazing method as set forth in Aspects 1 to 8, a glazing method for glazing a substrate including a step of depositing a glaze slurry thereon, is characterized by employing, as the substrate, a substrate having a relief surface, a thin glaze layer coating the relief surface to a thickness which leaves recesses on the relief surface, a thin glaze layer coating the relief layer and an oil-repellent layer coating the thin glaze layer and repelling the thin glaze layer. This method gives a ceramic article of high quality having a relief pattern of a beautiful appearance.

Specifically, a ceramic article glazed to a sufficient thickness and clear shapes of crests and recesses of the relief pattern, in particular a ceramic article having a uniform thin glaze layer on the relief surface, may be obtained. Glazing can be done in such a manner as to preclude generation of non-glazed portions, such as pinholes or defects in appearance caused by sagging of the glaze slurry.

With the glazing method for as set forth in Aspect 2, in which a glaze slurry is applied to a moistened relief surface for forming the thin glaze layer, the thin glaze layer can be formed easily. That is, since even a minor amount of the glaze slurry can be readily affixed to the moistened relief surface, the thin glaze layer can be formed easily.

With the glazing method as set forth in Aspect 3, in which the thin glaze layer is formed using a glaze slurry containing a coloring agent, the range of forming the thin glaze layer can be defined, so that the boundary between an area where the thin glaze layer has been formed and an area where this layer has not been formed can be distinguished easily and reliably with naked eyes. Although the concentration of the glaze slurry tends to be changed due to, for example, moisture evaporation, such change in the glaze slurry concentration may be perceived since the glaze slurry contains the coloring agent.

With the glazing method as set forth in Aspect 4, in which the thin glaze layer is formed using a diluted glaze slurry, the thin glaze layer can be formed easily.

With the glazing method of Aspect 5, in which the thin glaze layer is formed using a glaze slurry having the glaze concentration thinner than that of the glaze slurry desired to be deposited on an exposed surface of the substrate not coated with the thin glaze layer or on an exposed surface of the thin glaze layer, the thin glaze layer can be formed easily.

With the glazing method of Aspect 6, in which the thin glaze layer is formed using a glaze slurry containing a thickener, the glaze slurry can be applied to the substrate using a glaze slurry application tool, such as a brush.

With the glazing method of Aspect 7, in which a repellent glaze layer is formed by solid paraffin, the glaze-repellent layer having a sharp edge and susceptible to lesser bleeding to the thin glaze layer may be formed easily. That is, the liquid paraffin obtained on heating the solid paraffin ceases to be fluid and is solidified promptly, when affixed to the thin glaze layer, so that the glaze-repellent layer having a sharp edge and susceptible to lesser bleeding to the thin glaze layer may be formed easily.

The method of Aspect 9, includes a glazing step of applying the glaze by the glazing method of Aspects 1 to 8, a ceramic article having a relief pattern of beautiful appearance and high dignity can be produced. That is, a ceramic article having a glaze with a sufficient thickness and clearly defined crests and recesses of the relief pattern, in particular a ceramic article having clearly defined crests and recesses of the relief pattern and a uniform thin glaze layer on the relief surface, can be produced.

With the ceramic article of Aspect 10, having a fired substrate having a relief surface, a fired relief surface glaze layer coating the relief surface to a thickness which will leave recesses of the relief surface, and a fired glaze layer having a thickness thicker than the fired relief surface glaze layer, with the fired relief surface coating the surface of the fired substrate other than the relief surface, the relief pattern is of a beautiful appearance and of high dignity. That is, the relief pattern is beautiful since the crests and recesses in the relief pattern are well-defined, while the appearance of the article is excellent since the non-relief surface has sufficient luster.

As many apparently widely different embodiments of the present invention can be made without departing from the spirit and scope thereof, it is to be understood that the invention is not limited to the specific embodiments thereof except as defined in the appended claims.

What is claimed is:

1. A method for glazing a substrate comprising, applying a first glaze slurry to a relief surface of a ceramic substrate to form a thin glaze layer coating on the relief surface having a thickness which leaves engraved or gravured recesses on said relief surface visible, and applying repellant coating to the thin glaze layer to form a repellant layer which repels a glaze slurry and applying a second glaze slurry to the substrate.

2. The glazing method as defined in claim 1 wherein said relief surface is moistened before applying the first glaze slurry.

3. The glazing method as defined in claim 1 wherein said glaze slurry contains a coloring agent.

4. The glazing method as defined in claim 1 wherein said glaze slurry is diluted prior to application to the surface.

5. The glazing method as defined in claim 1 wherein said thin glaze layer is formed using a glaze slurry containing a thickener.

6. The glazing method as defined in claim 1 wherein said glaze slurry is applied on a part of the surface of said substrate which is not covered by said repellant layer.

7. The glazing method as defined in claim 1 further comprising applying a repellant layer coating to form a repellant layer on a defined area of the relief surface.

8. The glazing method as defined in claim 7 wherein said defined area is an exposed surface on said substrate that is not coated with said thin glaze layer or is an exposed surface on said thin glaze layer.

9. The glazing method as defined in claim 7 wherein said repellent layer is formed by solid paraffin.

10. The glazing method as defined in claim 1 wherein the recess of the relief surface is between about 0.2 mm to 1.0 mm and the thickness of the thin layer is between about 0.03 mm and 0.20 mm.

11. The glazing method defined in claim 1 wherein the first and second glaze slurries differ.

* * * * *